(12) United States Patent
Mabe et al.

(10) Patent No.: US 10,508,692 B2
(45) Date of Patent: Dec. 17, 2019

(54) PROPELLER SHAFT AND PROPELLER SHAFT PRODUCTION METHOD

(71) Applicant: HITACHI AUTOMOTIVE SYSTEMS, LTD., Hitachinaka-shi, Ibaraki (JP)

(72) Inventors: Yasutomo Mabe, Zama (JP); Hiromichi Komai, Hadano (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 207 days.

(21) Appl. No.: 15/408,530

(22) Filed: Jan. 18, 2017

(65) Prior Publication Data

US 2017/0241482 A1    Aug. 24, 2017

(30) Foreign Application Priority Data

Feb. 24, 2016    (JP) ................... 2016-032580

(51) Int. Cl.
| | |
|---|---|
| *F16D 3/223* | (2011.01) |
| *F16D 3/84* | (2006.01) |
| *F16D 1/116* | (2006.01) |
| *F16D 3/2245* | (2011.01) |
| *F16D 1/10* | (2006.01) |

(52) U.S. Cl.
CPC .............. *F16D 3/223* (2013.01); *F16D 1/116* (2013.01); *F16D 3/2245* (2013.01); *F16D 3/845* (2013.01); *F16D 2001/103* (2013.01); *F16D 2003/22313* (2013.01); *F16D 2003/22323* (2013.01); *F16D 2250/0046* (2013.01); *F16D 2300/08* (2013.01); *Y10S 464/906* (2013.01)

(58) Field of Classification Search
CPC ........ F16D 3/223; F16D 3/2245; F16D 3/845; F16D 1/116; F16D 2300/08; F16D 2003/22313; F16D 2001/103; F16D 2250/0046; F16D 2003/22323; Y10S 464/906

USPC .................................. 464/145, 182; 427/235
See application file for complete search history.

(56) References Cited

U.S. PATENT DOCUMENTS

| | | | | |
|---|---|---|---|---|
| 5,885,162 A | * | 3/1999 | Sakamoto | ............... F16D 1/068 464/145 |
| 8,864,591 B2 | | 10/2014 | Sugiyama et al. | |

FOREIGN PATENT DOCUMENTS

| | | |
|---|---|---|
| JP | H04-093540 U | 8/1992 |
| JP | 2013-194895 A | 9/2013 |
| JP | 2015-135144 A | 7/2015 |

OTHER PUBLICATIONS

Office Action dated Sep. 3, 2019 in Japanese Application No. 2016-032580.

* cited by examiner

*Primary Examiner* — Greg Binda
(74) *Attorney, Agent, or Firm* — Foley & Lardner LLP

(57) ABSTRACT

Apparatus, such as a propeller shaft, includes an outer circumferential portion or outer race to rotate as a unit with an internal shaft (serving as the propeller shaft), an inner circumferential member or inner race to rotate as a unit with an external shaft and a plurality of balls disposed between the outer race and inner race, for transmitting rotation therebetween. A sleeve rotating as a unit with the inner race includes an inside cavity for receiving the external shaft. The sleeve is coated with a coating formed on an inside circumferential surface.

7 Claims, 7 Drawing Sheets

PROPELLER SHAFT AND PROPELLER SHAFT PRODUCTION METHOD

BACKGROUND OF THE INVENTION

The present invention relates to a structure and a production method of apparatus such as a propeller shaft usable for a motor vehicle.

A propeller shaft as disclosed in JP 2013-194895 A (corresponding to US 2013/0252748A1 Sugiyama et al.) is a shaft or shaft assembly for transmitting rotation from a drive source of a vehicle to a drive wheel or drive wheels. A shaft section of the propeller shaft extends in a longitudinal direction of the vehicle from a first shaft end to a second shaft end, and a constant velocity joint is provided between the first shaft end and a first shaft of a ferrous metallic material provided between the shaft section and the drive source, or between the second shaft end and a second shaft of a ferrous metallic material provided between the shaft section and the drive wheel(s).

The constant velocity joint includes: an outer cylindrical member or outer race provided at the first or second shaft end of the shaft section; an inner cylindrical member or inner race of a ferrous metallic material, disposed in the outer cylindrical member and coupled with the first or second shaft inserted in the inner cylindrical member, to enable transmission of a rotational torque between the inner cylindrical member and the first or second shaft; a plurality of balls disposed between the inner and outer cylindrical members for the torque transmission therebetween; and a sleeve member formed of a ferrous metallic material in the form of a hollow cylinder or tube, connected with an end portion of the inner cylindrical member on a side opposite to the shaft section and arranged to receive the first or second shaft inserted in the sleeve member.

The constant velocity joint further includes a seal member or seal ring to seal an annular clearance between the outside circumferential surface of the first or second shaft and the inside circumferential surface of the sleeve member liquidtightly. With this seal member, the constant velocity joint prevents entry of rain water through the clearance between the first or second shaft and the sleeve member, and eventually prevent sticking between the outside circumferential surface of the first or second shaft and the inside circumferential surface of the sleeve member due to rust formed by the rain water.

SUMMARY OF THE INVENTION

In this structure, however, the annular clearance between the sleeve member and the first or second shaft is open to the surrounding atmosphere in the outward region on the outward side of the seal member toward the atmosphere, and exposed to rain water. Therefore, the first or second shaft might be fixed to the inside circumferential surface of the sleeve member due to corrosion in the outward region.

The present invention has been devised in view of the problem of the earlier technology and it is an object of the present invention to provide a structure and a production method of apparatus such as a propeller shaft to prevent corrosion or rust between the sleeve and the first or second shaft.

Specifically, according to the present invention, an apparatus, such as a propeller shaft (to be provided between a drive source and a drive wheel of a vehicle) comprises: an outer race or outer circumferential portion adapted to rotate as a unit with a shaft on one side or internal shaft; an inner race or inner circumferential member provided in the outer race and adapted to rotate as a unit with a shaft on the other side or external shaft or mating shaft; and a plurality of rolling elements such as balls provided between the outer race and the inner race, for transmitting rotation from one of the outer and inner races to the other. The apparatus further comprises a sleeve rotating as a unit with the inner race and including an inside cavity for receiving the external shaft. The sleeve is coated with a coating.

DETAILED DESCRIPTION OF THE INVENTION

Following is explanation on embodiments of the present invention with reference to the drawings.

First Embodiment

Figure 1:
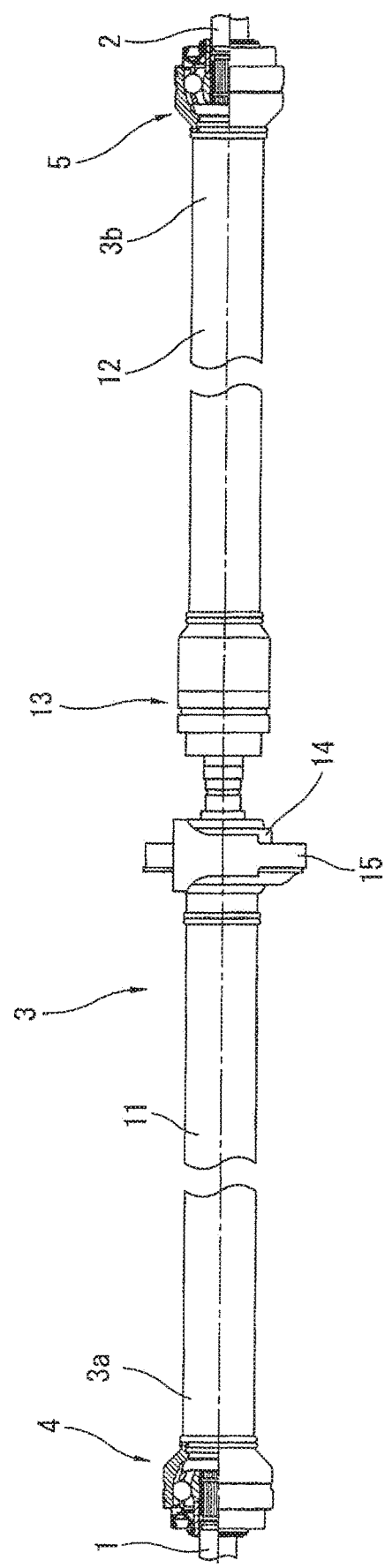
FIG. 1 is a side view showing a propeller shaft according to a first embodiment of the present invention, partly cut-away.
Figure 2:
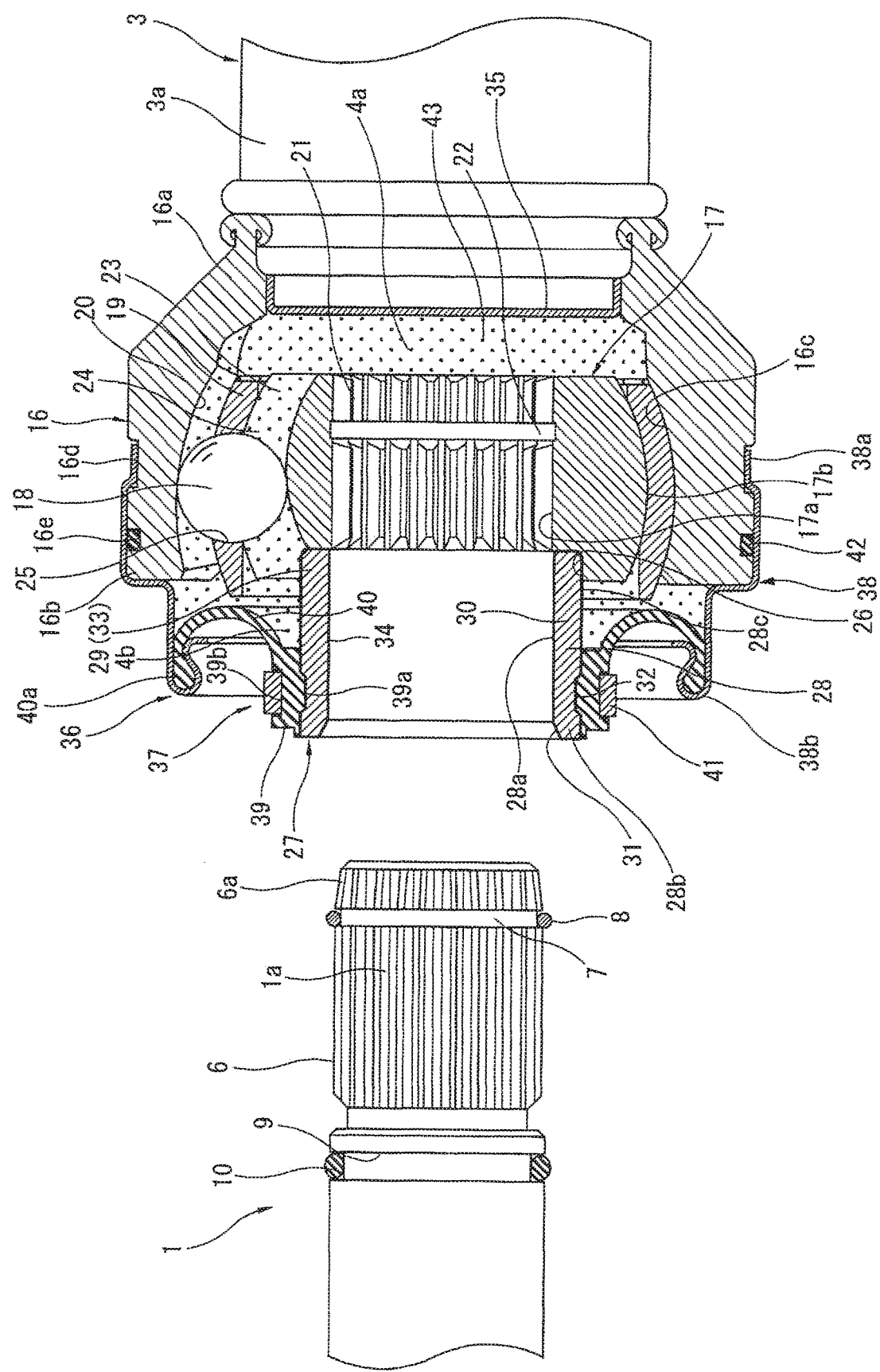
FIG. 2 is a vertical sectional view showing a first constant velocity joint of the propeller shaft of FIG. 1 in the state before an input shaft is inserted into the first constant velocity joint.
Figure 3:
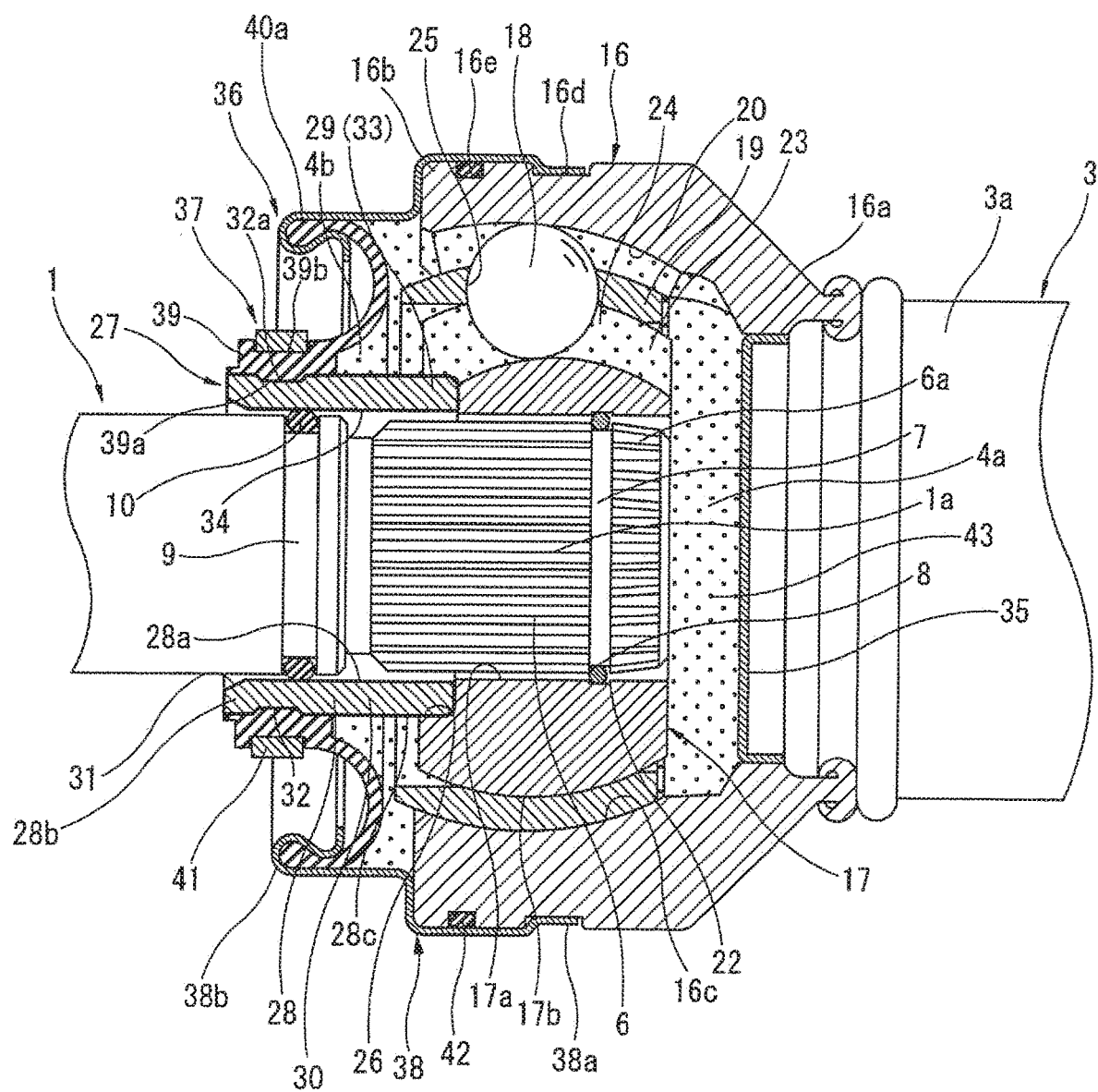
FIG. 3 is a vertical sectional view showing the first constant velocity joint of the propeller shaft of FIG. 1 in the state in which the input shaft is connected with the first constant velocity joint.

A first embodiment of the present invention is shown in FIGS. 1, 2 and 3. The propeller shaft of the first embodiment is a drive shaft or drive force transmitting shaft adapted to be connected between a drive source of a vehicle (not shown) and a drive wheel or drive wheels (not shown) of the vehicle and arranged to transmit a rotational force (drive force) of the drive source to the drive wheel(s). In this embodiment, the drive source is an engine, and the drive wheel(s) is disposed at a position away from the engine.

As shown in FIG. 1, the propeller shaft of this embodiment includes a shaft section 3 and first and second constant velocity joints 4 and 5. The shaft section 3 adapted to be provided between a first shaft on a drive source's side or driving side and a second shaft on a drive wheel's side or driven side. In this example, the first shaft is an input shaft 1 to be connected with a transmission (not shown) of the vehicle on the driving source's side, and the second shaft is an output shaft 2 to be connected with a differential (not shown) on the drive wheel's side. The first constant velocity joint 4 is attached to a first end 3a of the shaft section 3 on the drive source's side and arranged to couple the input shaft 2 and the shaft section 3 so that input shaft 2 and shaft section 3 can rotate as a unit. The second constant velocity joint 5 is attached to a second end 3b of the shaft section 3 on the drive wheel's side and arranged to couple the shaft section 3 and the output shaft 2 so that shaft section 3 and output shaft 2 can rotate as a unit. The thus-constructed propeller shaft has a function of transmitting the driving force transmitted to input shaft 1 through the transmission from the engine, to the output shaft 2.

Before the detailed explanation on the constituent parts of the propeller shaft, explanation is directed to the shapes of the ends of the input and output shafts 1 and 2 to be coupled with the first or second end of the shaft section 3 of the propeller shaft. Since the shapes of the ends of the input and output shafts 1 and 2 are substantially identical to each other, the following explanation is directed only to the input shaft 1, for convenience' sake.

As shown in FIGS. 2 and 3, the input shaft 1 is made of ferrous metallic material and includes an end portion 1a including externally splined portion or male spline portion 6 formed on the outside surface.

The externally splined portion 6 includes a forward end portion 6a tapered to the forward end of input shaft 1 (the right end of input shaft 1 as viewed in FIG. 2), and an annular groove 7 which is formed in the outside circumference and which has a substantially rectangular cross sectional shape. The tapered end portion 6a extends axially from the annular groove 7 to the forward end of input shaft 1 and the cross sectional size of the tapered end portion 6a becomes gradually smaller to the forward end of input shaft 1. A circlip or retaining ring 8 having a substantially circuit cross sectional shape is fit in the annular groove 7.

An annular seal member 10 is fit and held in an annular seal groove 9 formed in the input shaft 1 at an axial position close to the externally splined portion 6 so that the externally splined portion 6 is formed axially between the forward end of input shaft 1 and the annular seal groove 9. The annular seal member 10 is a seal ring of synthetic rubber in this example.

The shaft section 3 of the propeller shaft of this example has a split structure. That is, as shown in FIG. 1, the shaft section 3 includes a driving shaft 11 of an iron-based alloy adapted to be coupled with the input shaft 1 through the first constant velocity joint 4 and a driven shaft 12 of an iron-based alloy adapted to be coupled with the output shaft 2 through the second constant velocity joint 5. The driving shaft 11 and driven shaft 12 are coupled together by a third constant velocity joint 13 connecting the confronting ends of driving shaft 11 and driven shaft 12. Therefore, both shafts 11 and 12 can rotate as a unit at a constant rotational speed.

The shaft section 3 of this example includes a center bearing 14 attached to the driving shaft 11 at a position near third constant velocity joint 13. The center bearing 14 is adapted to be fixed to a lower portion of a floor panel of the vehicle body (not shown) through a bracket 15 attached around the center bearing 14. The thus-constructed center bearing 14 can support the propeller shaft rotatably and restrain deflection of the propeller shaft.

The first and second constant velocity joints 4 and 5 are substantially identical in the basic construction, to each other except for the difference in the connection with the input shaft 1 in the case of first constant velocity joint 4 and with the output shaft 2 in the case of second constant velocity joint 5. Accordingly, the following explanation is directed to the first constant velocity joint 4 only, and repetitive explanation on the second constant velocity joint 5 is omitted.

As shown in FIGS. 2 and 3, the first constant velocity joint 4 of this example is a Rzeppa universal joint. First constant velocity joint 4 mainly includes an outer circumferential portion or outer race 16, an inner circumferential member or inner race 17, a plurality of balls 18 disposed between the inner circumferential member 17 and the outer circumferential portion 16, and a cage 19 for holding each of the balls 18. The outer circumferential portion 16 is provided on the first end 3a of the shaft section 3 (the end of driving shaft 11). The inner circumferential member 17 is provided on the radial inner side of outer circumferential portion 16 and arranged to receive rotation from the input shaft 1. The balls 18 serve as a torque transmission means for transmitting torque from the inner circumferential member 17 connected with the input shaft 1, to the outer circumferential portion 16. The cage 19 is disposed between the inner circumferential member 17 and outer circumferential portion 16, for holding the balls 18.

The outer circumferential portion or outer race 16 is made of aluminum alloy and formed substantially in the shape of a hollow cylinder (shaped like a cup). Outer circumferential portion 16 extends from an outward end (or first end or front end) 16b to an inward end (or second end or rear end) 16a in an inward longitudinal direction toward the middle of the shaft section or toward the third constant velocity joint 13. The inward or rear end 16a is shaped to have a smaller inside diameter and joined to the fired end 3a of shaft section 3 (driving shaft 11) by friction pressure welding in this example so that the outer shell 16 is integral with the shaft section 3 (driving shaft 11).

The outer circumferential portion 16 includes an inside circumferential surface 16c formed in the shape of a concave surface appearing like a circular arc in the sectional view of FIG. 2, in a region near the outward end 16b. A plurality of outer engagement grooves 20 are formed in the inside circumferential surface 16c.

Each of the outer engagement grooves 20 guides one of the balls 18 and the number of the outer engagement grooves 20 is equal to the number of the balls 18. Outer engagement grooves 20 extend in the axial direction of the shaft section 3 (driving shaft 11 in the case of first constant velocity joint 4), at respective positions arranged circumferentially at regular intervals around the center axis in the inside circumferential surface 16c. The cross section of each outer engagement groove 20 is semicircular or arc-shaped. A part of each ball 18 is fit in the corresponding one of outer engagement grooves 20. This engagement between balls 18 and outer engagement grooves 20 functions to regulate relative rotation between the outer circumferential portion 16 and the balls 18 circumferentially around the axis of shaft section 3 (driving wheel 11).

The inner circumferential member or inner race 17 is made of ferrous metallic material and formed substantially in the shape of a hollow cylinder. Inner circumferential member 17 includes an insertion hole or inside cavity 17a extending axially, and an internally splined portion or female spline portion 21 which is formed in the inside circumferential surface of insertion hole 17a, and which extends axially from an outward or first end (left end in FIG. 2) to an inward or second end (right end) closer to the shaft section 3.

Specifically, the internally splined portion 21 is formed in a region extending axially from the inward end at or near the open end of insertion hole 17a on the inward side toward the shaft section 3 to the outward end at or near the open end of insertion hole 17a on the outward side away from the shaft section 3 and arranged to transmit rotation of input shaft 1 to inner circumferential member by the engagement with the externally splined portion 6 of input shaft 1.

The internally splined portion 21 includes an annular retaining groove 22 which is formed at an axial position between the axial middle and the inward end of internally splined portion 21 and which is adapted to receive the circlip 8 of the input shaft 1 fittingly. The axial position of input shaft 1 relative to inner circumferential member 17 is determined by the engagement of the circlip 8 in the retaining groove 22.

The inner circumferential member 17 includes an outside circumferential surface 17b formed in the shape of a convex surface appearing like a circular arc in the sectional view of FIG. 2. A plurality of inner engagement grooves 23 are formed in the outside circumferential surface 17b.

Each of inner engagement grooves 23 guides one of the balls 18 and the number of the inner engagement grooves 20 is equal to the number of the balls 18. Inner engagement grooves 23 extend in the axial direction of the shaft section 3 (driving shaft 11 in the case of first constant velocity joint 4), at respective positions arranged circumferentially at regular intervals around the center axis. The cross section of each inner engagement groove 23 is semicircular or arc-shaped. A part of each ball 18 is fit in the corresponding one of inner engagement grooves 23. This engagement between balls 18 and inner engagement grooves 23 functions to regulate relative rotation between the inner circumferential member 17 and the balls 18 circumferentially around the axis of shaft section 3.

Each of balls 18 is received in a track 24 defined by a pair of outer engagement groove 20 and inner engagement groove 23 confronting each other in the manner to enable the ball 18 to roll in the track 24. Thus, the balls 18 can transmit torque between the inner circumferential member 17 and the outer circumferential portion 16 while holding equal speeds with the engagement with the respective outer engagement grooves 20 and the inner engagement grooves 23 regulating the relative rotation around the axis of shaft section 3.

The cage 19 is a cylindrical member having a shape like a hollow cylinder. Cage 19 includes windows 25 opening radially through the circumferential wall of cage 19. Each ball 18 is received and retained in one of the windows 25, so that the number of windows 25 is equal to the number of balls 18.

In the engagement state in which the externally splined portion 6 of input shaft 1 is fit in the internally splined portion 21 of inner circumferential member 17, the thus-constructed first constant velocity joint 4 can transmit rotational torque inputted to input shaft 1, from the inner circumferential member 17 rotating as a unit with the input shaft 1, through the balls 18 forming torque transmission paths and outer circumferential portion 16, to the shaft section 3 of the propeller shaft while holding the rotational speed of the shaft section 3 equal to the rotational speed of input shaft 1.

A sleeve receiving portion 26 is formed in inner circumferential member 17 at the open end on the outward side opposite to the inward side closer to the shaft section 3. Inner circumferential member 17 extends from the inward end (the right end as viewed in FIGS. 2 and 3) confronting the shaft section 3 to the outward end (the left end as viewed in FIGS. 2 and 3) remoter from the shaft section 3, and the insertion hole 17a also extends from the inward end to the outward end. The sleeve receive portion 26 is a portion enlarged to have an inside diameter greater than an inside diameter of the internally splined portion 21. In this example, the internally splined portion 21 extends between the inward (right) end of inner circumferential member 17 to the sleeve receiving portion 26. A sleeve member 27 forming a part of first constant velocity joint 4 is inserted in the sleeve receiving portion 26. In this example, the sleeve receiving portion 26 is defined by a radially extending annular shoulder surface abutting against an end surface of the sleeve 27 and an inside circumferential surface meeting the radially extending shoulder surface to form a corner and fitting over the outside circumferential surface of sleeve 27.

The sleeve member 27 includes a sleeve main portion 28 which is a tubular portion shaped like a hollow cylinder. Sleeve member 27 or the tubular sleeve main portion 28 extends from an inward end (the right end as viewed in FIGS. 2 and 3) closer to the shaft section 3 to an outward end 28b (the left end as viewed in FIGS. 2 and 3) remoter from the shaft section 3 in the axial direction of sleeve member 27. The tubular sleeve main portion 28 includes an insert portion 29 which is a portion including the inward (right) end of sleeve member 27 closer to the shaft section 3.

The tubular sleeve main portion 28 is made of a ferrous metallic material, and hardened almost entirely to have a high hardness. Specifically, the tubular sleeve main portion 28 includes a quenched or hardened portion 30 hardened by quenching (heat treatment), and the insert portion 29 is included in the hardened portion 30 so that the hardness of insert portion 29 is increased by the heat treatment.

The inside diameter of tubular sleeve main portion 28 is slightly greater than the outside diameter of input shaft 1 and slightly greater than the inside diameter of internally splined portion 21 of inner circumferential member 17. At the time of operation of connecting the input shaft 1 and the shaft section 3, the input shaft 1 is inserted into the tubular sleeve main portion 28 and the seal ring 10 mounted on input shaft 1 abuts elastically against an inside circumferential surface 28a of tubular sleeve main portion 28.

A tapered portion (or flared portion) 31 is formed at the outward (left) end 28b of tubular sleeve main portion 28, on the outward side opposite to the inward side on which the insert portion 29 is formed. In the tapered portion 31, the inside circumferential surface 28a is enlarged gradually toward the outward (left) end 28b so that the inside diameter is increased gradually to the outward end 28b. This tapered portion 31 acts to facilitate insertion of input shaft 1 smoothly into tubular sleeve main portion 28.

A boot fixing annular groove 32 is formed in an outside circumferential surface 28c of tubular sleeve main portion 28. The boot fixing annular groove 32 is a groove for fixing a main body 37 of a boot 36 as mentioned later. This boot fixing annular groove 32 is formed between the inward (right) end and the outward (left) end 28b of tubular sleeve main portion 28, at a predetermined axial position closer to the outward end 28b. Specifically, in the assembled state of FIG. 3, a middle 32a of boot fixing annular groove 32 is located axially between the seal ring 10 and the outward end 28b, so that the middle 32a closer to the outward end 28b and the seal ring 10 is remoter from the outward end 28b. The middle 32a is an axial middle of the axial width of boot fixing annular groove 32.

The insert portion 29 is almost entirely formed as a press fit portion 33 having an outside diameter for being fit fixedly in the sleeve receiving portion 26 in a manner of interference fit. The thus-formed insert portion 29 of tubular sleeve main portion 28 is inserted axially in the inserting or inward direction (rightward direction) and fixed in sleeve receiving portion 26 of inner circumferential member 17.

Sleeve member 27 (sleeve main portion 28) includes a coating 34 formed preliminarily by plating such as electrolytic plating or electroless plating. In either case, the coating 34 is formed entirely on the outside surfaces of sleeve member 27 (sleeve main portion 28) by impregnation in plating solution. The insert portion 29 (or press fit portion 33) coated with the coating 34 is forcibly fit in the sleeve receiving portion 26 and thereby the sleeve member 27 is fixed to the inner circumferential member 17 so that they are united as a unit.

Thus, the propeller shaft according to this embodiment is produced by a method comprising a coating process of coating the surface of sleeve member 27 with the coating 34, and a press fitting process of inserting the insert portion 29 of sleeve member 27 covered with the coating 34 forcibly into the sleeve receiving portion 26 of inner circumferential member 17, thereby to fix the sleeve member 27 to inner circumferential member 17.

The coating 34 is made of metallic material, such as nickel, having a rust resistance higher than that of the material of sleeve main portion 28, and formed on the surface of sleeve main portion 28 to have a surface roughness smaller than that of sleeve main portion 28. Thus, the sleeve member or tubular sleeve main portion 28 is coated with the rust-preventive coating 34.

First constant velocity joint 4 of this example further includes a seal cap 35 and a boot 36. The seal cap 35 is fit and fixed in the rear or inward end portion 16a of outer circumferential portion 16 and arranged to close an inside space 4a near the rear or inward end. The boot 36 is provided between outer circumferential portion 16 and sleeve member 27 and arranged to close an inside space 4b on the front or outward side.

The boot 36 includes, as main part, a boot main body 37 provided on sleeve member 27 and a retainer 38 to retain the boot main body 37.

The boot main body 37 is made of rubber or synthetic resin and shaped in an annular form having a U-shaped cross section bulging toward the balls 18. Specifically, the boot main body 37 includes an inner circumferential portion 39 to be fixed to sleeve member 27, an outer circumferential portion 40a and an intermediate portion 40 extending curvedly to bulge toward balls 18, between the outer and inner circumferential portions to form the U-shaped cross section, and thereby closing the front or outward side inside space 4b of first constant velocity joint 4.

The inner circumferential portion 39 of boot main body 37 is mounted on sleeve member 37 with engagement between an engagement projection 39a formed integrally in the inside circumference of the inner circumferential portion 39 and the boot fixing annular groove 32 formed in the sleeve member 27. Furthermore, The inner circumferential portion 39 is compressed and fixed to sleeve member 27 by a boot band 41 fit in an annular band groove 39b formed in the outside circumferential surface of inner circumferential portion 39.

The retainer 38 of boot 36 is a cylindrical member made from metallic plate or sheet and formed with an annular step. Retainer 38 includes a base portion 38a and a forward portion 38b. The base portion 38a is a portion bent or depressed radially inward and fit fixedly in an annular groove 16d formed in the outside circumferential surface of outer circumferential portion 16. The forward portion 38b is bent so as to form a U turn and arranged to grip the outer circumferential portion 40a of boot main body 37 tightly. Furthermore, an O ring 42 of synthetic rubber is provided between retainer 38 and outer circumferential portion 16. O ring 42 is fit in an O ring groove 16e formed in the outside circumferential surface of outer circumferential portion 16 at a position axially between the annular groove 16d and the forward end 16b and arranged to seal the interspace between the retainer 38 and outer circumferential portion 16 liquidtightly.

The inside space of first constant velocity joint 4 is closed by the seal cap 35 and boot 36 and filled with grease 43.

According to the propeller shaft of this embodiment, the seal ring 10 is interposed resiliently between input shaft 1 and sleeve member 27 at the time of connecting input shaft 1 with the first constant velocity joint 4. Therefore, the propeller shaft can prevent invasion of rain water and other objects into the inside of first constant velocity joint 4 through the clearance between input shaft 1 and sleeve member 27. Consequently, it is possible to prevent fixation due to rust in the interface between input shaft 1 and sleeve member 37 on the inward side of seal ring 10 toward the shaft section 3, and the interface between the externally splined portion 6 of input shaft 1 and the internally splined portion 21 of inner circumferential member 17, and hence to facilitate the operation of removing the input shaft 1 from first constant velocity joint 4 without requiring excessive force for extraction of input shaft 1, at the time of repairmen of the propeller shaft for example.

Moreover, it is possible to improve the durability of input shaft 1 and first constant velocity joint 4 by protecting the torque transmitting function from being deteriorated by corrosion between the externally splined portion 6 of input shaft 1 and the internally splined portion 21 of inner circumferential member 17.

Furthermore, according to this embodiment, the inside circumferential surface 28a of tubular sleeve main body 28 (or sleeve member 27) is coated with the coating 34 having a rust resistance, or resistance to corrosion, higher than that of the material of sleeve main body 28. Therefore, even if rain water adheres to the inside circumferential surface 28a on the outward side of seal ring 10, closer to the atmosphere, the coating 34 protects the outward region of inside circumferential surface 28a against corrosion (rust). Consequently, it is possible to prevent fixation due to rust in the interface between input shaft 1 and sleeve member 27 on the outward side of seal ring 10 toward the atmosphere, and further to prevent deterioration in the workability of the operation of extracting the input shaft 1 from first constant velocity joint 4.

Furthermore, in the case of the conventional propeller shaft in which the coating 34 is not formed on the inside circumferential surface 28a of sleeve main body 28, corrosion produced in the inside circumferential surface 28a on the outward side of seal ring 10 may proceed beyond seal ring 10 into first constant velocity joint 4 and cause corrosion between the externally splined portion 6 and internally splined portion 21, resulting in deterioration in the function of transmitting torque between input shaft 1 and first constant velocity joint 4. By contrast, the propeller shaft according to this embodiment can prevent corrosion in the inside circumferential surface 28a on the outward side of seal ring 10 as mentioned before, hence maintain the torque transmission ability of input shaft 1 and first constant velocity joint 4, and improve the durability of the propeller shaft.

According to this embodiment, almost the whole of insert portion 29 of sleeve member 27 is made as the press fit portion 33 and the press fit portion 33 is fixed by press fitting in the sleeve receiving portion 26. Therefore, at the time of extraction of input shaft 1 from inner circumferential member 17, the sleeve member 27 is not removed together with input shaft 1, from inner circumferential member 17, so that the workability is improved in the disassembling operation for repairmen of the propeller shaft and other purposes.

In this embodiment, the surface roughness of coating 34 is set smaller than the surface roughness of sleeve main body 28. Therefore, the adherence or contact of seal ring 10 to the sleeve main body 28 is improved as compared to direct contact of the seal ring 10 with the inside circumferential surface 28a of sleeve main body 28, and hence the sealing performance between sleeve main body 28 and input shaft 1 is improved. Furthermore, it is possible to reduce the risk of damage of seal ring 10 due to contact with a rough surface and hence to improve the durability of seal ring 10.

Moreover, in this embodiment, the most part of sleeve main body 28 is subjected to heat treatment such as quenching or hardening and formed into the quenched or hardened portion 30. This structure can improve the strength of sleeve main body 28 at the time of insertion of the inset portion 29 into the sleeve receiving portion 26 forcibly, and prevent damage and deformation of sleeve main body 28 at the time of the forcible inserting operation.

Second Embodiment

Figure 4:
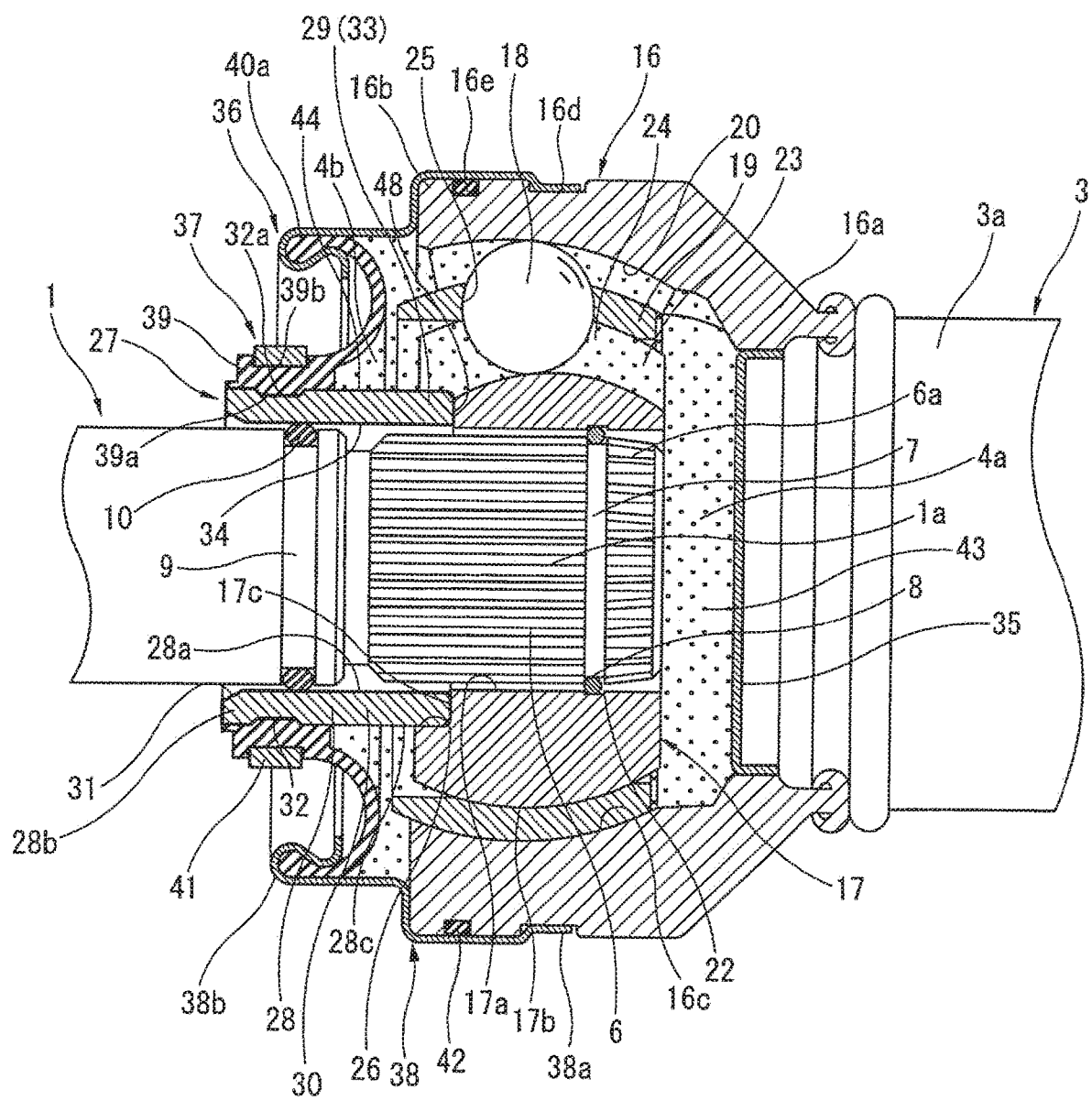
FIG. 4 is a vertical sectional view showing a first constant velocity joint of a propeller shaft according to a second embodiment of the present invention in the state in which an input shaft is connected with the first constant velocity joint.

FIG. 4 shows a second embodiment of the present invention. The propeller shaft according to the second embodiment is basically identical in construction to that of the first embodiment, but different in that part of the coating 34 covering the surface of sleeve member 27 (sleeve main body 28) is intentionally removed. In the second embodiment (and subsequent embodiments), the same reference numerals are used for the same constituent parts as the first embodiment, and repetitive explanation is omitted.

Specifically, the sleeve member 27 according to the second embodiment includes a coating removal portion 44 (or bared region) in the outside circumference of tubular sleeve main body 28. This coating removal portion 44 is formed in the outside circumferential surface 28c of sleeve main body 28 at least in a region covering the insert portion 29. In this practical example according to the second embodiment, the coating removal portion 44 is formed entirely in the region from the boot fixing annular groove 32 toward the insert portion 29 to the inward end of tubular sleeve main portion 28.

More specifically, the coating removal portion 44 (or the bared region of the outside circumferential surface) is surrounded by the outer circumferential portion 16 and boot 36 and exposed to the space enclosed by the outer circumferential portion 16, inner circumferential member 17 and boot 36, so that the surface of coating removal portion 44 is in contact with the grease 43 filled in this space.

Figure 5:
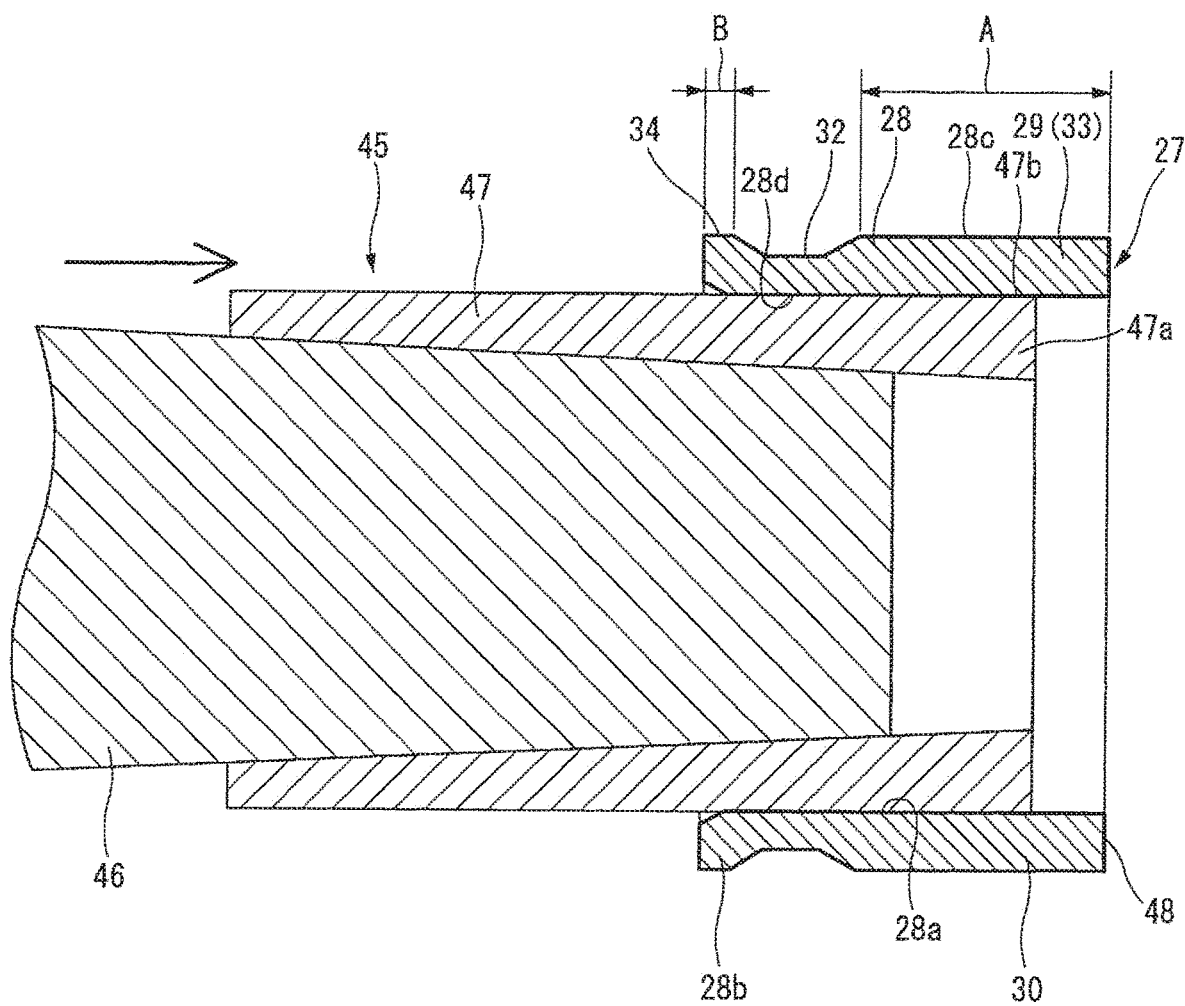
FIG. 5 is a vertical sectional view showing a sleeve member according to the second embodiment, held by a rotating device.

In this example, the coating removal portion (or the bared region) 44 is formed by holding firmly or fixing the tubular sleeve main portion 48 entirely coated with coating 34 by the before-mentioned coating step with a sleeve rotating device 45 shown in FIG. 5 (a holding step or substep), rotating the sleeve main portion 48 with the sleeve rotating device 45 (a rotating step or substep) and grinding the entirety of the region of outside circumferential surface 28c on the inward side (or the right side as viewed in FIG. 5) of the boot fixing annular groove 32, toward the insert portion 29 with a grinding tool (not shown) (a coating removing step or substep).

The sleeve rotating device 45 includes a rotating portion 46 shaped like a circular column and arranged to be rotated by an actuator such as a motor (not shown), and a holding or fixing member 47 shaped like a hollow cylinder and arranged to fit over the rotating portion 46 for holding the sleeve member 27 fixedly.

The rotating portion 46 of sleeve rotating device 45 is adapted to be inserted axially into the holding member 47 and withdrawn axially from holding member 47, and tapered (shaped like a wedge) so that the outside diameter is decreased gradually to a forward end (the right end in FIG. 5).

The holding or fixing member 47 includes an inside cavity tapered so that the inside diameter is decreased gradually to a forward end 47a and has a split structure divided at a predetermined position or positions in the circumferential direction. Accordingly, when the rotating portion 46 is inserted into the holding member 47 toward the forward end 47a, the holding member 47 expands gradually in the radial outward direction, hence presses the outside surface 47b of holding member 47 radially outwards against a fixed region 28d of the inside circumferential surface 28a of sleeve main portion 28, and thereby hold (clamps) the sleeve member 27 firmly so that the sleeve member 27 rotates as a unit with the rotating member 47.

The above-mentioned grinding tool is made of hard metallic material and designed to remove the coating 34 on the outside circumferential surface 28c by being pushed on the outside circumferential surface 28c of sleeve main portion 28 rotated at a high speed with the sleeve rotating device 45. The coating 34 is removed only in the predetermined region in outside circumferential surface 28c. The coating 34 is left unremoved, as a coating unremoved portion 48 (or coated region), in the remaining region of outside circumferential surface 28c and an end surface of the inward end of sleeve main portion 28.

In general, an operation of plating the entire surface of a metallic member all at once is more advantageous in working efficiency etc. than an operation of plating partially.

However, in the case of sleeve member 27 including the insert portion 29 (press fit portion 33) fit forcibly in another metallic member (inner circumferential member 17), the formation of coating 34 on the insert portion 29 increases the outside diameter of insert portion 29 and tends to impede the insertion into the sleeve receiving portion 26. Moreover, since the coating 34 is thin and lower in the strength for withstanding press fitting as compared to the base material of sleeve main portion 28, the coating 34 might be peel off the insert portion 29 at the time of inserting operation, resulting in debris scattered in first constant velocity joint 4.

Therefore, in the second embodiment, the coating 34 is removed partly from the outside circumferential surface 28c of sleeve main portion 28 in the region of insert portion 29 by the before-mentioned coating removing step. Accordingly, it is possible to set the outside diameter of insert portion 29 equal to a desired design value, and it is easy to control the interference between the insert portion 29 and the sleeve receiving portion 26 and to insert the insert portion 298 accurately into the sleeve receiving portion 26. Moreover, it is possible to avoid the problem of debris of the coating 34 scattered inside the first constant velocity joint 4.

The coating removal portion 44 of this embodiment is formed entirely over the region of outside circumferential surface 28c from the boot fixing annular groove 32 to the end of insert portion 29. Therefore, it is possible to reduce the working load for the removal of the coating without requiring minute operation to grind only the outside surface of insert portion 29, and accordingly it is possible to improve the operability of the coating removing step.

The coating removal portion 44 according to the second embodiment is enclosed by the outer circumferential portion 16 and boot 36. This structure protects the coating removal portion 44 against rain water and other object and hence against rust.

Furthermore, the grease 43 is filled in the space enclosed by outer circumferential portion 16, inner circumferential member 17 and boot 36. Therefore, the grease 43 covers and protects the coating removal portion 44 against rust more effectively.

Specifically, the coating 34 is left unremoved in the end surface of insert portion 29 of sleeve main portion 28 as the coating unremoved portion 48. This structure can protect the end surface of insert portion 29 against rust even if rain water enters beyond the seal ring 10 through the clearance between input shaft 1 and sleeve member 27. Accordingly, this structure prevents the end surface of insert portion 29 of sleeve main portion 28 from being fixed, by rust, to a shoulder surface 17c formed between the internally splined portion 21 of inner circumferential member 17 and the sleeve receiving portion 26, and thereby prevents deterioration of the workability in the operation of removing input shaft 1 from first constant velocity joint 4.

To remove a coating of a cylindrical member such as the coating 34 of sleeve member 27 (sleeve main portion 28), generally a rotating device is used to clamp the outside surface of the cylindrical member and to rotate the cylindrical member.

However, in the case of the sleeve main portion of the second embodiment, the outside circumferential surface 28c of sleeve main portion 28 includes a wide region A on one side (right side) (inward side) of the boot fixing groove 32 and a narrow region B on the opposite side (left side) (outward side) of the boot fixing groove 32 as shown in FIG. 5. The wide region A is a region in which the coating 34 is to be removed, and therefore, the region A is inadequate as a region to be clamped. The region adequate for clamping is limited to the narrow region B. Therefore, an operation of clamping only the narrow region B could increase the surface pressure in the region B excessively and deform sleeve main portion 28.

In the second embodiment, by contrast, the inside circumferential surface 28a of sleeve main portion 28 is used as the fixed portion 28d, and the sleeve main portion 28 is held firmly by abutment in a wide area between the inside circumferential 28a of sleeve main portion 28 and the outside circumferential surface 47b of holding member 47 of sleeve rotating device 45. Therefore, it is possible to prevent excessive increase of the surface pressure and deformation of sleeve member 27.

Third Embodiment

Figure 6:
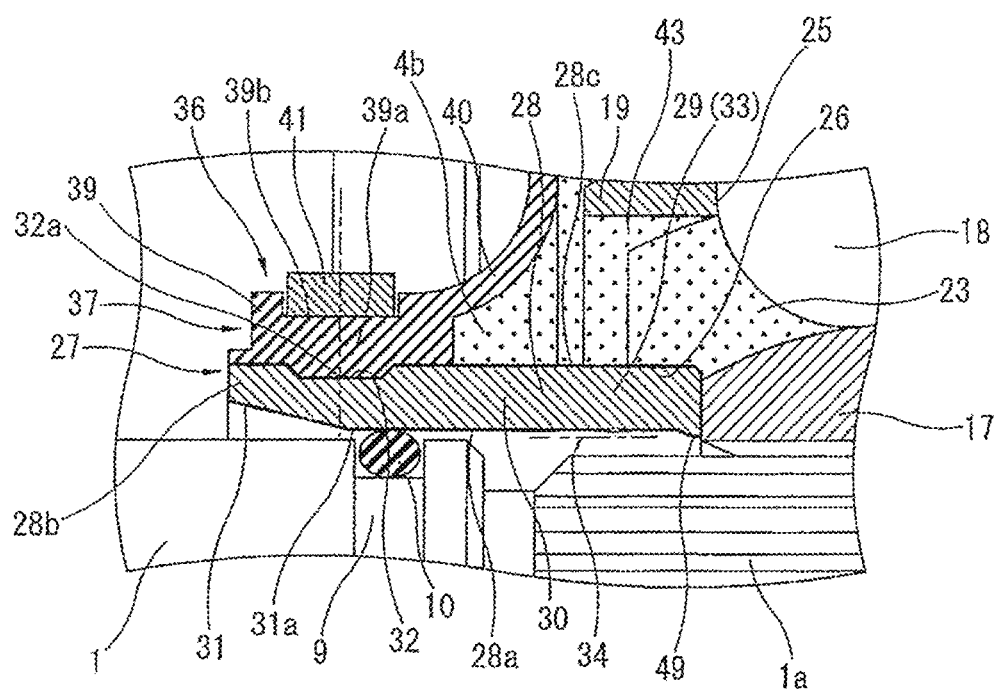
FIG. 6 is an enlarged sectional view showing a main portion of a first constant velocity joint of a propeller shaft according to a third embodiment of the present invention.

FIG. 6 shows a third embodiment of the present invention. The propeller shaft according to the third embodiment is substantially identical in the basic construction to the propeller shaft of the first embodiment, but different from the first embodiment in the shape of sleeve member 27 on the inner circumferential side.

Specifically, the sleeve member 27 according to the third embodiment includes an inward side or insert side taper portion 49 which is formed on the inner circumferential side of sleeve member 27 at or near the inward (right) end of insert portion 29. The inward side taper portion 49 is shaped to have a tapered or conical inside circumferential surface so that the inside diameter sleeve main portion 28 is decreased gradually to the inward end of insert portion 29. The coating 34 is formed also in the surface of the inward side taper portion 49 by the before-mentioned coating step. In FIG. 6, part of the coating 34 is schematically shown by a one-dot chain line.

The anti-insert side taper portion or outward side taper portion 31 in sleeve member 27 according to the third embodiment extends inwardly to an end 31a which is located on the insert side or inward (right) side of the axial middle 32a of boot fixing annular groove 32 in the axial direction. The inside diameter is increased from the end 31a gradually toward the outward end 28b of sleeve main portion 28.

Therefore, the propeller shaft according to the third embodiment can provide the same operations and effects as in the first embodiment. Moreover, the inward side taper portion 49 can serve as guide when the externally splined portion 6 of input shaft 1 is fit into the internally splined portion 21 of inner circumferential member 17, and thereby facilitate the operation of inserting input shaft 1 into inner circumferential member.

Furthermore, the coating 34 covering the inside circumferential surface of inward side taper portion 49 decreases the sliding resistance in the insertion of input shaft 1 significantly as compared to sliding movement directly on the surface of sleeve main portion 28, and further facilitates the operation of inserting input shaft 1 into inner circumferential member.

Moreover, the outward side or anti-insert side taper portion 31 extends longer beyond the position of axial middle 32a of boot fixing annular groove 32, to the end 31a toward insert portion 29, near the seal ring 10.

Therefore, the radial clearance between input shaft 1 and sleeve member 7 on the atmosphere's side or outward side of seal ring 10 is increased relatively except for the narrow region near seal ring 10. This structure serves to prevent fixation between the input shaft 1 and sleeve member 27 by rust even if the coating 34 is peeled off from the region of inside circumferential surface 28a of sleeve main portion 28 on the atmosphere's side of seal ring 10 and the rust resistance is decreased.

Fourth Embodiment

Figure 7:
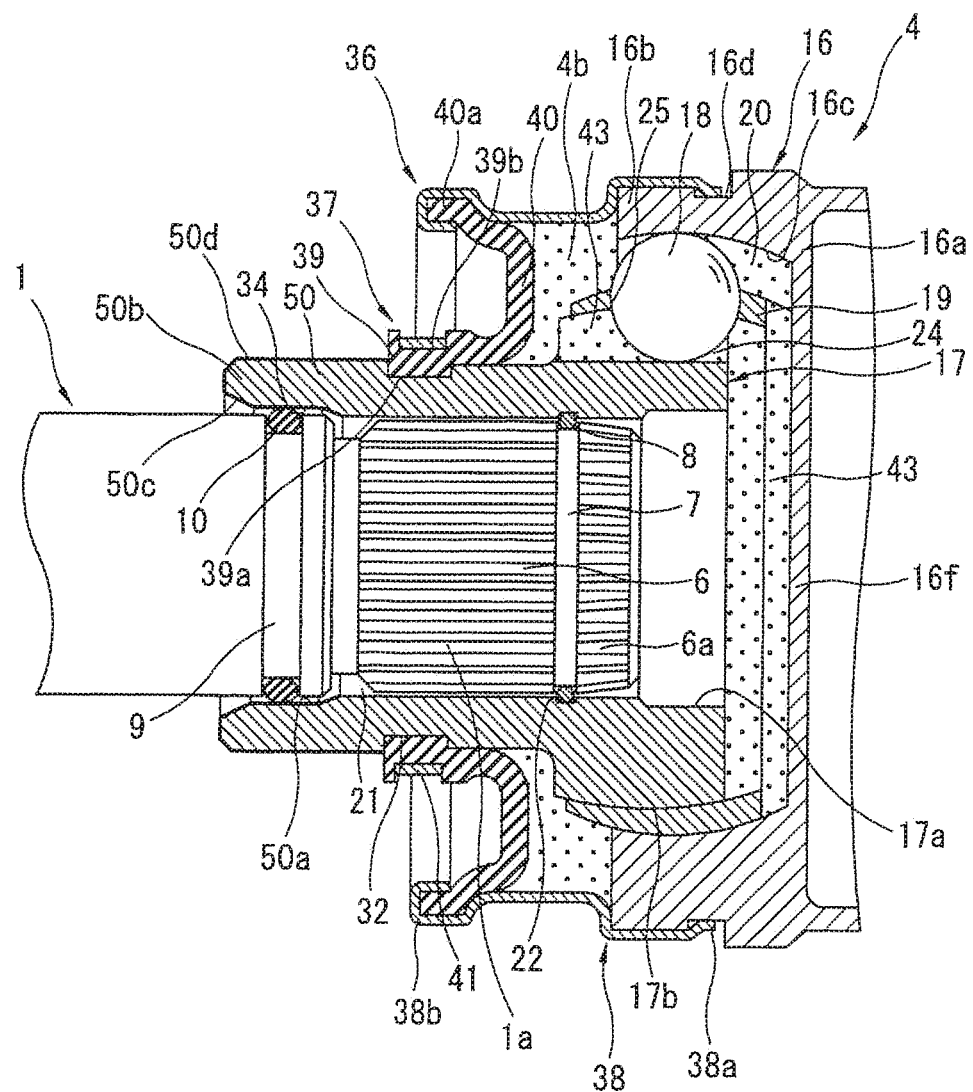
FIG. 7 is a vertical sectional view showing a first constant velocity joint of a propeller shaft according to a fourth embodiment of the present invention in the state in which an input shaft is connected with the first constant velocity joint.

FIG. 7 shows a fourth embodiment of the present invention in which the inner circumferential member 17 and sleeve member 27 of the first embodiment are formed as a single integral unit, by integral molding or casting, for example.

The inner circumferential member 17 according to the fourth embodiment includes a sleeve portion 50 as an integral part of inner circumferential member 17. The sleeve portion 50 extends axially in the outward direction toward the position of input shaft 1 (in the leftward direction as viewed in FIG. 7) to an outward (left) end 50b and has a shape like a hollow cylinder for serving as a sleeve.

The sleeve portion 50 includes an inside cavity having an inside diameter substantially equal to the inside diameter of insertion hole 17a of inner circumferential member 17. An inside circumferential surface 50a of sleeve portion 50 is formed continuously with the inside circumferential surface of insertion hole 17a so as to form a continuous cylindrical cavity extending axially. The internally splined portion 21 and the retaining groove 22 are formed in the inside circumferential surface of this continuous cavity at or near the middle of the continuous cavity in the axial direction.

In the assembled state shown in FIG. 7, the seal ring 10 mounted on input shaft 1 abuts elastically on an outward region or front region of the inside circumferential surface 50a of sleeve portion 50. This outward region is a region extending between the internally splined portion 21 and the outward end or front end 50b of sleeve portion 50 on the outward side remoter from the shaft section 3.

The sleeve portion 50 includes a taper surface 50c formed in the inside circumferential surface 50a at the outward end 50b for facilitating insertion of input shaft 1 into the sleeve portion 50. Moreover, the boot fixing annular groove 32 is formed in an outside circumferential surface 50d for holding the boot main body 37.

The coating 34 is formed on the end surface of outward end 50b, the region of inside circumferential surface 50a axially between the internally splined portion 21 and the outward end 50b and the region of outside circumferential surface 50d between the boot fixing annular groove 32 and the outward end 50b.

In the example of FIG. 7, the seal cap 35 for closing the inward opening of outer circumferential portion 16 is omitted. Instead, the outer circumferential portion 16 includes an end wall 16f which is formed integrally in outer circumferential portion 16 and which closes the inward side of outer circumferential portion 16 for ensure the liquid tight sealing in first constant velocity joint 4.

In the thus-constructed propeller shaft of the fourth embodiment, the seal ring 10 disposed elastically between input shaft 1 and sleeve portion 50 can prevent the entry of rain water into the inside of first constant velocity joint 4 and thereby prevent the generation of rust. Moreover, the coating 34 covering the inside circumferential surface 50a of sleeve portion 50 can prevent corrosion (rust) in the inside circumferential surface 50a due to rain water on the outward side of seal ring 10.

Consequently, it is possible to prevent fixation due to rust in the interface between input shaft 1 and sleeve portion 50 and hence to facilitate the operation of removing the input shaft 1 from first constant velocity joint 4 as in the first embodiment.

The present invention is not limited to the above-mentioned embodiments. Various variations and modifications are possible within the purview of the present invention.

For example, the outer circumferential portion 16 may be an outer circumferential member which is joined or fastened to the shaft section 3 at the time of assemblage of the propeller shaft, instead of the outer circumferential portion 16 provided integrally at the end of shaft section 3 as in the examples of the preceding embodiments.

The press fit portion 33 may be a part of the insert portion 29 as long as the insert portion 29 can be fit firmly and fixed in the sleeve receiving portion 26, instead of the press fit portion 33 formed in almost the whole of insert portion 29 as in the examples of the preceding embodiments.

The quenched or hardened portion 30 may be only a part of sleeve main portion 28 as long as the insert portion can be press fit in the sleeve receiving portion 26 properly, instead of the sleeve main portion 28 quenched entirely or almost entirely as in the examples of the preceding embodiments.

According to the illustrated embodiments as explained above, an apparatus, such as a propeller shaft (to be provided between a drive source and at least one drive wheel of a vehicle), a joint such a constant velocity joint for a propeller shaft or a shaft assembly including two shafts (internal and external shafts) connected by a joint, comprises: an outer race or outer shell (or outer circumferential portion) adapted to rotate as a unit with an internal shaft (such as the shaft 11 or 12); an inner race or inner shell (or inner circumferential member) disposed in the outer race and adapted to rotate as a unit with an external shaft or mating shaft (such as the shaft 1 or 2); and a plurality of rolling elements such as balls provided between the outer race and the inner race, for transmitting rotation from one of the outer and inner races to the other (through a variable angle therebetween). The apparatus further comprises a sleeve rotating as a unit with the inner race and including an inside cavity for receiving the external shaft (1, 2). The sleeve is coated with a coating. In addition to these basic features, the apparatus may have any one or more of the following feature (f1)-(f22).

(f1) The outer race includes outer engagement grooves which are formed in an inside circumferential surface of the outer race and which are arranged to receive and guide the balls respectively; and the inner race includes inner engagement grooves which are formed in an outside circumferential surface of the inner race, and which are arranged to receive and guide the balls respectively. The balls guided by these grooves of the outer and inner races can transmit rotation between the outer and inner races while the angle between the external and internal shafts is variable. (f2) The inner race includes an internally splined or threaded portion formed in an inside circumferential surface of the inner race and which is adapted to be engaged with an externally splined or threaded portion of the external shaft or mating shaft which is one of the first shaft (1) and the second shaft (2).

(f3) The inner race or inner circumferential member includes a sleeve receiving portion which is formed in the inner circumferential member on an outward side (anti-insertion side, left side) toward the mating shaft and which is shaped to enlarge the inside cavity of the inner circumferential member so that an inside diameter of the inner circumferential member is greater in the sleeve receiving portion than in a region in which the internally splined portion is formed; and the sleeve includes a tubular main portion which extends axially from an outward end (remoter from the internal shaft or the shaft section) (on the outward side) to an inward end (closer to the internal shaft or the shaft section) (in an inward direction, inserting direction or rightward direction as viewed in FIG. 2), and includes an insert portion formed to extend from the inward end toward the outward end and inserted into the sleeve receiving portion of the inner circumferential member and an inside circumferential surface defining an inside cavity into which the mating shaft is to be inserted, the inside circumferential surface of the sleeve member being covered with a coating higher in rust resistance than a material of the tubular main portion. (f4) The inner race or inner circumferential member includes an annular shoulder surface or abutment surface facing in the outward direction, and abutting on the inward end of the sleeve (the tubular main portion) inserted in the inner race.

(f5) The apparatus further comprises an annular seal member (such as seal ring 10) disposed between an inside circumferential surface of the sleeve and an outside circumference surface of the external shaft inserted through the inside cavity of the sleeve. (f6) The sleeve (such as sleeve member 27 or sleeve portion 50) includes the inside circumferential surface defining the inside cavity of the sleeve, and the inside circumferential surface of the sleeve is coated with the coating such as a coating having a rust resistance higher than that of the material of the sleeve (or the tubular main portion) and arranged to abut on or confront the outside circumferential surface of the external shaft via the coating.

(f7) The insert portion of the tubular main body or main portion of the sleeve member is fit forcibly in the sleeve receiving portion of the inner circumferential member. (f8)

The sleeve includes an outside circumferential surface including a coated region coated with the coating and a bared region bared by removing the coating at least in a region of the insert portion.

(f9) The sleeve member includes a boot fixing annular groove, formed in the outside circumferential surface of the tubular main portion of the sleeve member, for retaining a boot enclosing an inside space between the outer circumferential portion and the inner circumferential member to prevent entry of foreign object, and the bared region extends from the boot fixing annular groove over the insert portion toward or to the inward end. (f10) The bared region is surrounded by the boot and the outer circumferential portion. (f11) A grease is filled in a space enclosed by the outer circumferential portion, the inner circumferential member and the boot. (f12) The insert portion of the sleeve member extends in an inward direction (inserting direction or rightward direction) toward the internal shaft or the shaft section to the inward end which includes an end surface coated with the coating left unremoved. (f13) The sleeve member includes the bared region which is formed by removing the coating in the bared region in the outside circumferential surface of the tubular main portion in the state in which the sleeve member is rotated with a rotating device fitting in (the inside cavity of) the sleeve member.

(f14) The surface roughness of the coating is set smaller than the surface roughness of the tubular main portion. (f15) The sleeve member includes an inward side taper portion tapered to decrease the inside diameter of the tubular main portion gradually to an inward end of the insert portion which extends in an inward direction or inserting direction toward the internal shaft or the shaft section to the inward end of the insert portion. (f16) The sleeve includes a boot fixing annular groove (32), formed in the outside circumferential surface, for retaining a boot enclosing an inside space between the outer circumferential portion and the inner circumferential member to prevent entry of foreign object, and an outward side (anti-insert side, left side) taper portion tapered to increase the inside diameter of the sleeve (or the tubular main portion) gradually to an outward end of the sleeve (or the tubular main portion) which extends along an axis of the sleeve in an outward direction (or extracting direction) away from the internal shaft or the shaft section to the outward end; and the outward side taper portion extends from the outward end of the sleeve (or the tubular main portion) in an inward direction (or inserting direction) toward the internal shaft or the shaft section (opposite to the outward direction), beyond a middle (32a) of an axial width of the boot fixing annular groove (to an inward end (31a) located on an inward (right) side of the middle (32) of the boot fixing annular groove (32)). (f17) The sleeve includes a hardened or quenched portion. In the preceding embodiments, the sleeve is made of ferrous metallic material or ion-based metal.

(f18) A production method of producing an apparatus, such as a propeller shaft, a joint such a constant velocity joint for a propeller shaft or a shaft assembly including two shafts (internal and external shafts) connected by a joint, as mentioned above, including any one or more of the features (f1)~(f17), comprises: a first method element of coating the sleeve (sleeve member) with a coating higher in rust resistance than a material of the tubular main portion; and a second method element of inserting an inward part (the insert portion) of the sleeve, from the inward (right) end of the sleeve, into the inner race (inner circumferential member) so that the inward part (insert portion) is press fit in the inner race. (f19) The production method further comprises a third or removing method element of removing the coating in a predetermined first (inward) region of an outside circumferential surface of the sleeve (sleeve member), the predetermined first (inward) region being a region between the inward end of the sleeve member and a boot fixing annular groove formed in the outside circumferential surface of the sleeve. (f20) In the removing method element, the coating is left unremoved in an end surface (or annular end surface) of the inward end of the sleeve member (or in the annular end surface of the sleeve facing in the inward direction or inserting direction) and abutting on an annular shoulder surface (17c) of the inner race (17) facing in the outward direction or extracting direction). (f21) The removing method element or third method element comprises: a holding sub-element of holding the sleeve member by inserting a rotating device (47, 46) into the sleeve member and holding the sleeve member firmly from the inside; a rotating sub-element of rotating the sleeve member with the rotating device inserted in the sleeve member; and a removing sub-element of removing the coating in the predetermined inward region in the state in which the sleeve member is rotated by the rotating device. (f22) The production method further comprises a third or removing method element of removing the coating in a predetermined first (inward) region of an outside circumferential surface of the sleeve (sleeve member) and leaving the coating in a predetermined second (outward) region of the outside circumferential surface of the sleeve (sleeve member), the predetermined first (inward) region and second (outward) region being separated from each other by a boot fixing annular groove formed in the outside circumferential surface of the sleeve.

This application is based on a prior Japanese Patent Application No. 2016-032580 filed on Feb. 24, 2016. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A propeller shaft for transmitting rotation from a drive source of a vehicle to a drive wheel of the vehicle, the propeller shaft comprising:
   a shaft section adapted to be provided between a first shaft on a drive source's side and a second shaft on a drive wheel's side;
   an outer circumferential portion provided on the shaft section and formed with an inside circumferential surface defining an inside cavity;
   an inner circumferential member provided in the outer circumferential portion and formed with an inside circumferential surface defining an inside cavity;
   a plurality of balls provided between the outer circumferential portion and the inner circumferential member;
   outer engagement grooves which are formed in the inside circumferential surface of the outer circumferential portion in a manner to extend along a rotation axis of the shaft section and which are arranged to receive the balls and thereby to regulate relative rotation between the balls and the outer circumferential portion around the rotation axis of the shaft section;
   inner engagement grooves which are formed in an outside circumferential surface of the inner circumferential member, and which are arranged to receive the balls and thereby to regulate relative rotation between the balls and the inner circumferential member around the rotation axis of the shaft section;

an internally splined portion which is formed in the inside circumferential surface of the inner circumferential member and which is adapted to be engaged with an externally splined portion of a mating shaft which is one of the first shaft and the second shaft;

a sleeve receiving portion which is formed in the inner circumferential member on an outward side toward the mating shaft and which is shaped to enlarge the inside cavity of the inner circumferential member so that an inside diameter of the inner circumferential member is greater in the sleeve receiving portion than in a region in which the internally splined portion is formed;

a sleeve member including a tubular main portion which extends axially from an outward end to an inward end, and includes an insert portion formed to extend from the inward end toward the outward end and inserted into the sleeve receiving portion of the inner circumferential member and an inside circumferential surface defining an inside cavity into which the mating shaft is to be inserted, the inside circumferential surface of the sleeve member being covered with a coating higher in rust resistance than a material of the tubular main portion; and an annular seal member provided between the sleeve member and the mating shaft, wherein the sleeve member includes an inward side taper portion tapered to decrease an inside diameter of the tubular main portion gradually to an inward end of the insert portion which extends in an inward direction toward the shaft section to the inward end of the insert portion.

2. The propeller shaft as claimed in claim 1, wherein the insert portion of the tubular main portion of the sleeve member includes a press fit portion fit forcibly in the sleeve receiving portion of the inner circumferential member.

3. The propeller shaft as claimed in claim 1, wherein a surface roughness of the coating is smaller than a surface roughness of the tubular main portion.

4. The propeller shaft as claimed in claim 1, wherein the sleeve member includes a boot fixing annular groove, formed in an outside circumferential surface of the tubular main portion of the sleeve member, for retaining a boot enclosing an inside space between the outer circumferential portion and the inner circumferential member to prevent entry of a foreign object, and an outward side taper portion tapered to increase the inside diameter of the tubular main portion gradually to an outward end of the tubular main portion which extends along an axis of the sleeve member in an outward direction away from the shaft section to the outward end; and wherein the outward side taper portion extends from the outward end of the tubular main portion in the inward direction toward the shaft section, beyond a middle of an axial width of the boot fixing annular groove.

5. The propeller shaft as claimed in claim 1, wherein the tubular main portion of the sleeve member includes a quenched portion subjected to quenching.

6. The propeller shaft as claimed in claim 1, wherein the coating is a covering layer formed by plating.

7. A shaft assembly for transmitting rotation from a drive source of a vehicle to a drive wheel of the vehicle, the shaft assembly comprising:

the propeller shaft as claimed in claim 1; and the mating shaft, which is connected with the propeller shaft, wherein the mating shaft includes an outside circumferential surface formed with the externally splined portion which is engaged with the internally splined portion of the propeller shaft.

\* \* \* \* \*